Figure 1:
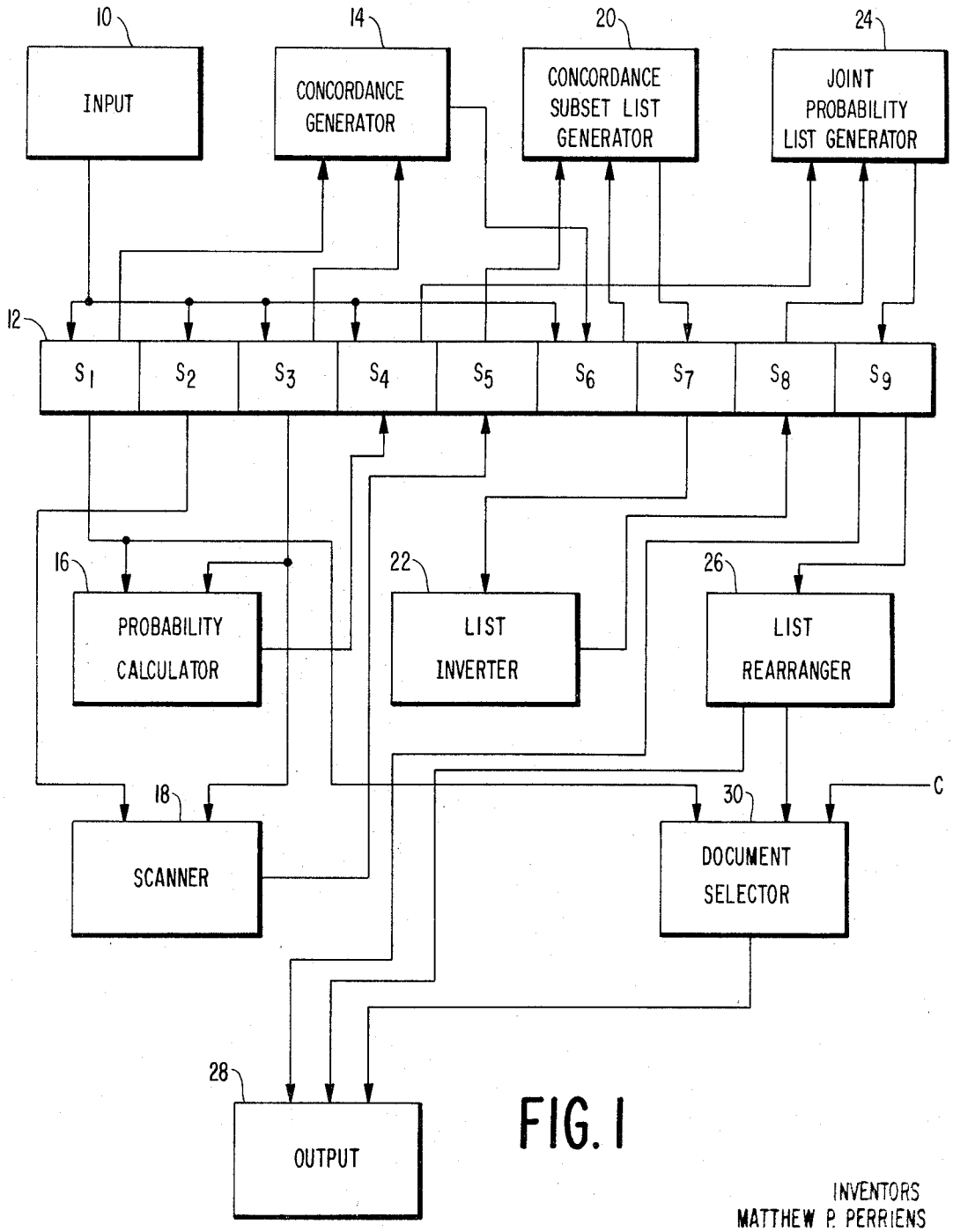
Figures 2, 3, 4:
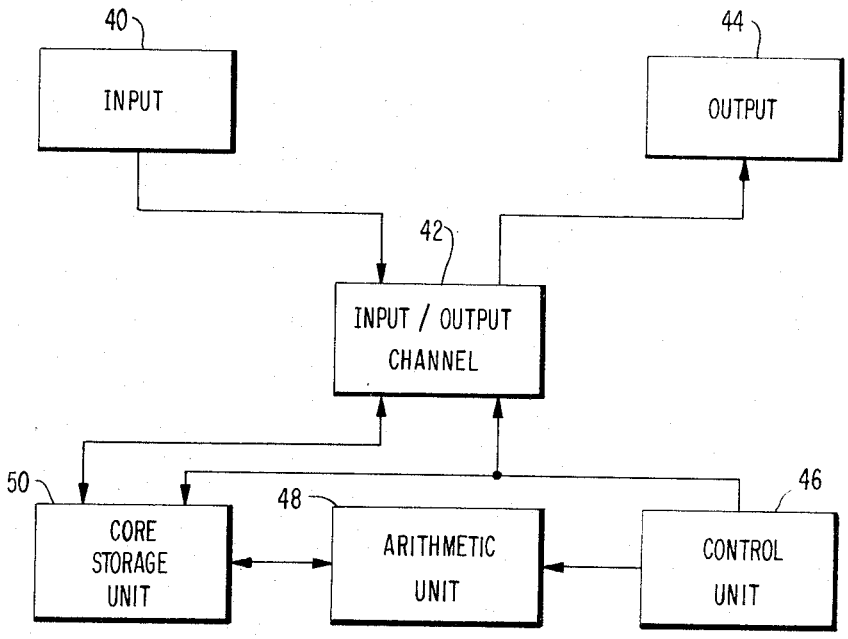

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 18, 1972

900 O.G. 817

T900,006
INFORMATION STORAGE AND RETRIEVAL SYSTEM AND METHOD

Matthews P. Perriens, Rockville, Md., and John H. Williams, Jr., Annandale, Va., assignors to International Business Machines Corporation, Armonk, N.Y.

Continuation of application Ser. No. 736,837, June 13, 1968. This application Apr. 19, 1971, Ser. No. 135,467
Int. Cl. G06f *1/00, 7/00, 15/00*
U.S. Cl. 340—172.5
3 Sheets Drawing. 21 Pages Specification

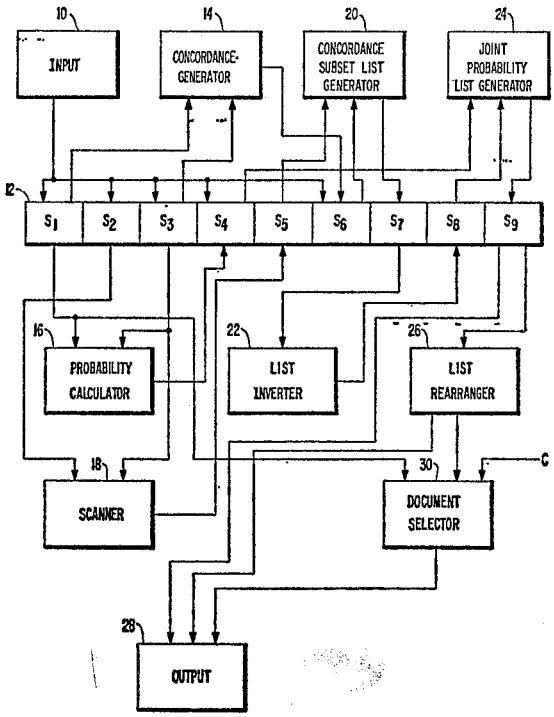

An information storage and retrieval system and method capable of handling queries in sentence form and presenting responses either as identification numbers of potentially pertinent documents or as documents in full text form. Stored documents containing so-called search symbols are known to the system. A probability calculator determines the likelihood of the occurrence of a search symbol at least once in a given stored document in the system's data base. The system and method causes the query text to be scanned so as to determine which search symbols are contained therein. The term overlap is used to designate a search symbol in the query and also in a given stored document. The particular document in the system's data base having the smallest joint probability of occurrence of overlap search symbols is designated as having the highest relevance potential within the data base to a given query. The stored document having the next larger joint probability of occurrence of overlap search symbols, has the next highest relevance potential. In this manner, any select number of relevant stored documents may be outputted by the system and method, in the order of relevance, as either identification numbers of potentially pertinent documents or as the documents per se in full text form.

INFORMATION STORAGE AND RETRIEVAL SYSTEM AND METHOD

Original Filed June 13, 1968 3 Sheets-Sheet 1

INVENTORS
MATTHEW P. PERRIENS
JOHN H. WILLIAMS, JR.

BY T. Tancin Jr.

ATTORNEY

CONCORDANCE

| SEARCH SYMBOLS | DOCUMENT NUMBERS | | | | |
|---|---|---|---|---|---|
| $SS_1$ | $DOC_1$ | $DOC_{17}$ | $DOC_{23}$ | .... | $DOC_m$ |
| $SS_2$ | $DOC_3$ | $DOC_{12}$ | $DOC_{17}$ | .... | $DOC_{m-x}$ |
| $SS_3$ | $DOC_3$ | $DOC_{23}$ | $DOC_{50}$ | .... | $DOC_{m-x}$ |
| $SS_4$ | $DOC_2$ | $DOC_5$ | | | |
| . . . | | | | | |
| $SS_n$ | $DOC_7$ | $DOC_{18}$ | $DOC_{19}$ | $DOC_{20}$ | $DOC_{m-x}$ |

DOCUMENTS

| SEARCH SYMBOLS | | | | |
|---|---|---|---|---|
| $SS_1$ | $DOC_1$ | $DOC_2$ | $DOC_5$ | $DOC_6$ |
| $SS_2$ | $DOC_4$ | $DOC_6$ | | |
| $SS_3$ | $DOC_1$ | $DOC_3$ | $DOC_5$ | |
| $SS_4$ | $DOC_2$ | | | |
| $SS_5$ | $DOC_5$ | $DOC_8$ | | |
| $SS_6$ | $DOC_4$ | $DOC_6$ | | |

LIST I

FIG.5A

| | $SS_1$ | $SS_2$ | $SS_3$ | $SS_4$ | $SS_5$ | $SS_6$ |
|---|---|---|---|---|---|---|
| $DOC_1$ | X | | | | | |
| $DOC_2$ | X | | | | | |
| $DOC_5$ | X | | | | | |
| $DOC_6$ | X | | | | | |

ITERATION #1

FIG.5B

| | $SS_1$ | $SS_2$ | $SS_3$ | $SS_4$ | $SS_5$ | $SS_6$ |
|---|---|---|---|---|---|---|
| $DOC_1$ | X | | | | | |
| $DOC_2$ | X | | | | | |
| $DOC_5$ | X | | | | | |
| $DOC_6$ | X | X | | | | |
| $DOC_4$ | | X | | | | |

ITERATION #2

FIG.5C

SEARCH SYMBOLS

| DOCUMENTS | $SS_1$ | $SS_2$ | $SS_3$ | $SS_4$ | $SS_5$ | $SS_6$ |
|---|---|---|---|---|---|---|
| $DOC_1$ | X | | X | | | |
| $DOC_2$ | X | | | X | | |
| $DOC_5$ | X | | X | | X | |
| $DOC_6$ | X | X | | | | X |
| $DOC_4$ | | X | | | | X |
| $DOC_3$ | | | X | | | |
| $DOC_8$ | | | | | X | |

LAST ITERATION

FIG.6

| DOCUMENT NUMBER | JOINT PROBABILITY |
|---|---|
| $DOC_1$ | $P(SS_1) \times P(SS_3) = P_1$ |
| $DOC_2$ | $P(SS_1) \times P(SS_4) = P_2$ |
| $DOC_5$ | $P(SS_1) \times P(SS_3) \times P(SS_5) = P_5$ |
| $DOC_6$ | $P(SS_1) \times P(SS_2) \times P(SS_6) = P_6$ |
| $DOC_4$ | $P(SS_2) \times P(SS_6) = P_4$ |
| $DOC_3$ | $P(SS_3) = P_3$ |
| $DOC_8$ | $P(SS_5) = P_8$ |

FIG.7

| DOCUMENT NUMBER | JOINT PROBABILITY |
|---|---|
| $DOC_5$ | $P_5$ |
| $DOC_6$ | $P_6$ |
| $DOC_4$ | $P_4$ |
| $DOC_2$ | $P_2$ |
| $DOC_1$ | $P_1$ |
| $DOC_3$ | $P_3$ |
| $DOC_8$ | $P_8$ |

GIVEN
$P_5 < P_6 < P_4 < P_2 < P_1 < P_3 < P_8$